US008688840B2

(12) United States Patent
Kong et al.

(10) Patent No.: US 8,688,840 B2
(45) Date of Patent: Apr. 1, 2014

(54) MEDIA TRANSMISSION METHOD AND APPARATUS IN A COMMUNICATION SYSTEM

(75) Inventors: Dong-Keon Kong, Suwon-si (KR); Deug-Ku Chang, Yongin-si (KR); Dae-Seok Kim, Seoul (KR); Sang-Jun Moon, Yongin-si (KR); Sung-Won Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1015 days.

(21) Appl. No.: 11/894,420

(22) Filed: Aug. 21, 2007

(65) Prior Publication Data

US 2008/0052406 A1 Feb. 28, 2008

(30) Foreign Application Priority Data

Aug. 25, 2006 (KR) ........................ 10-2006-0081232

(51) Int. Cl.
*G06F 15/16* (2006.01)
(52) U.S. Cl.
USPC ............................ 709/227; 709/206; 709/237
(58) Field of Classification Search
USPC ........................................ 709/237, 206, 227
See application file for complete search history.

(56) References Cited

U.S. PATENT DOCUMENTS

| 5,727,002 | A  | * | 3/1998  | Miller et al. ................... 714/748 |
| 6,170,016 | B1 | * | 1/2001  | Nakai et al. ................... 709/232 |
| 6,438,603 | B1 | * | 8/2002  | Ogus ............................ 709/233 |
| 6,445,717 | B1 | * | 9/2002  | Gibson et al. ................. 370/473 |
| 7,148,982 | B2 | * | 12/2006 | Terao ........................... 358/1.15 |
| 7,509,377 | B2 | * | 3/2009  | Harvey et al. ................. 709/206 |
| 7,509,390 | B1 | * | 3/2009  | Raman et al. ................. 709/213 |
| 7,543,073 | B2 | * | 6/2009  | Chou et al. .................... 709/231 |
| 2002/0101621 | A1 | * | 8/2002 | Terao ........................... 358/405 |
| 2006/0041679 | A1 | * | 2/2006 | Feig ............................. 709/236 |
| 2006/0075095 | A1 | * | 4/2006 | Horio et al. ................... 709/224 |
| 2007/0025301 | A1 | * | 2/2007 | Petersson et al. ............. 370/338 |
| 2007/0180113 | A1 | * | 8/2007 | Van Bemmel ................ 709/226 |
| 2007/0226295 | A1 | * | 9/2007 | Haruna et al. ................ 709/204 |
| 2007/0233896 | A1 | * | 10/2007 | Hilt et al. ....................... 709/238 |
| 2007/0239839 | A1 | * | 10/2007 | Buday et al. ................. 709/208 |
| 2008/0052406 | A1 | * | 2/2008 | Kong et al. ................... 709/237 |
| 2009/0070437 | A1 | * | 3/2009 | Ruckart ....................... 709/219 |

FOREIGN PATENT DOCUMENTS

KR    10-2005-0103048 A    10/2005

OTHER PUBLICATIONS

Office Action dated Jan. 28, 2010 in connection with Korean Patent Application No. 10-2006-0081232.

\* cited by examiner

*Primary Examiner* — Viet Vu
*Assistant Examiner* — Keyvan Emdadi

(57) ABSTRACT

A media transmission method and apparatus of a first server using a session-based messaging service in a communication system. The first server sets Media Relay Capacity (MRC) information of a first User Equipment (UE), transmits the set MRC information to a second server, receives a response from the second server after transmitting the MRC information, and notifies the response to the first UE. The response is a response that the second server has received from a second UE after notifying the second UE of the setting of the MRC information.

18 Claims, 6 Drawing Sheets

MEDIA TRANSMISSION METHOD AND APPARATUS IN A COMMUNICATION SYSTEM

CROSS-REFERENCE TO RELATED APPLICATIONS AND CLAIM OF PRIORITY

This application claims the benefit under 35 U.S.C. §119 (a) of a Korean Patent Application filed in the Korean Intellectual Property Office on Aug. 25, 2006 and assigned Serial No. 2006-81232, the disclosure of which is incorporated herein by reference.

TECHNICAL FIELD OF THE INVENTION

The present invention relates generally to a media transmission method and apparatus in a mobile communication system, and in particular, to a method and apparatus for efficiently sending media using a session-based messaging service.

BACKGROUND OF THE INVENTION

Generally, Internet Protocol (IP) Multimedia Subsystem (IMS) or Multimedia Domain (MMD) provides messaging services in which users can exchange IP-based user messages with each other.

The 'message' as used herein means text or multimedia application layer data exchanged between users, or User Equipments (UEs), of IMS. The message may include a Session Initiation Protocol (SIP) message, meaning the data exchanged over an SIP session to deliver signaling information used in the messaging service, and a Message Session Relay Protocol (MSRP) message, meaning the data exchanged over an MSRP session to actually deliver a user message.

A messaging service provided in IMS may include 'instant messaging' and 'session (or SIP)-based messaging service'. The instant messaging is a scheme for delivering a short message or a short media message over an SIP message. In this case, because the instant messaging directly uses an SIP message and does not separately form (or establish) an MSRP session, it does not form an SIP session used for forming an MSRP session, as well. However, the session-based messaging service is used for continuous message exchange. In this case, because each message is delivered over an MSRP message other than the SIP message, there is a need for an SIP session used for generating the MSRP session.

FIG. 1 is a diagram illustrating a network configuration for message delivery in the general IMS.

In IMS, a core network (CN) can be divided into a Call Session Control Function (CSCF) block and a Home Subscriber Server (HSS) block according to function.

The CSCF block performs a call/session processing-related function, and is divided into Proxy CSCF (P-CSCF) #1 115a and #2 115b, Integrating CSCF (I-CSCF) #2 125, and Serving CSCF (S-CSCF) #1 120a and #2 120b according to their function.

The P-CSCF#1 115a and P-CSCF#2 115b are elements serving as a gateway when a UE first accesses the network to receive an IMS service, and they serve as proxy and User Agent (UA). Basically, they relay SIP messages between the UE and the network. The I-CSCF#2 125 serves as a contact for all incoming calls to connect with a subscriber in the network, and routes a call by inquiring of the HSS for location detection of a terminating (or called) subscriber. In addition, because the I-CSCF#2 125 serves as a gateway to another IMS network, it can also serve as a firewall for hiding topology in the network for security. The S-CSCF#1 120a and the S-CSCF#2 120b each perform a registration function to the corresponding network and various authentication functions necessary therefor. That is, for provisioning of various multimedia services, the S-CSCF#1 120a and the S-CSCF#2 120b each perform a series of mechanisms of directly interworking with application servers, routing a call based on triggering information, and providing the services.

Referring to FIG. 1, a UE#1 100 delivers an SIP message for forming an SIP session, to the P-CSCF#1 115a, a first contact point of an external network where it is currently located, via a Radio Access Network (RAN) #1 105a (see 11).

The P-CSCF#1 115a searches for a home network B of the UE#1 100, and delivers the SIP message to the S-CSCF#1 120a of the home network B (see 12).

The S-CSCF#1 120a searches for a home network C of a UE#2 110 to which the UE#1 100 desires to form an SIP session. The SIP message delivered by the S-CSCF#1 120a, if it enters the home network C, is preferentially delivered to the I-CSCF#2 125 (see 13), and then delivered to the S-CSCF#2 120b of the home network C via the I-CSCF#2 125 (see 14).

The S-CSCF#2 120b searches for an external network D where the UE#2 110 to which it provides the service is currently located, and delivers an SIP message to the P-CSCF#2 115b of the external network D (see 15). Finally, the UE#2 110 receives the SIP message delivered via the RAN#2 105b (see 16).

Through the processes 11 through 16, the UE#1 100 and the UE#2 110 exchange SIP messages with each other, thereby establishing an SIP session. On the contrary, if the SIP message is delivered from the UE#2 110 to the UE#1 100, the message delivery is achieved in the reverse order of the processes 11 through 16.

MSRP is a text-based connection-oriented protocol for exchanging arbitrary Multipurpose Internet Mail Extension (MIME) contents, especially instant messages. MSRP can deliver the entire message in one complete unit, or can deliver the message in several divided chunk units.

An MSRP session is formed over an SIP session. The information necessary for forming the MSRP session, including MSRP URL addresses and ports of the UE#1 100 and UE#2 110, and media characteristics of the MSRP message to be delivered over the MSRP session, is delivered over Session Description Protocol (SDP) of the SIP message. Actually, the user data is delivered over a separate MSRP session from the SIP session. While the SIP session is formed via CSCFs, the MSRP session is formed by means of general Transmission Control Protocol (TCP) connection.

MSRP has two request types: 'SEND' and 'REPORT'. SEND is for sending one complete message, or sending a part, or a chunk, of the complete message, and REPORT is for sending state information of a previously sent message, or sending a byte range of the message.

FIG. 2 is a diagram illustrating a procedure for forming an MSRP session for sending a general instant message.

Referring to FIG. 2, in step 215, a UE#1 200 generates its own MSRP URL in SDP, and sends an SIP INVITE message containing the SDP to a UE#2 210. For example, the INVITE message can be expressed as 'a=path:msrp://UE#1pc.example.com:7777/iau39;tcp'.

In step 220, the UE#2 210 generates its own MSRP URL in SDP, and sends an SIP 200 OK message containing the SDP to the UE#1 200. For example, the 200 OK message can be expressed as 'a=path:msrp://bob.example.com:8888/9di4ea;tcp'.

In step 230, the UE#1 200 sends a SIP ACK message, a response to the 200 OK message, to the UE#2 210, and sets up TCP connection. Thereafter, in step 240, the UE#1 200 sends a particular message to the UE#2 210 over an MSRP SEND message. For example, the MSRP SEND message can be expressed as follows.

```
'MSRP d93kswow SEND
    To-Path: msrp://UE#2.example.com:8888/9di4ea;tcp
    From-Path:
msrp://UE#1pc.example.com:7777/iau39;tcp
    Message-ID: 12339sdqwer
    Content-Type: text/plain
    Hi, I'm UE#1!
    -------d93kswow$'
```

After receiving the MSRP SEND message in step 240, the UE#2 210 responds to the UE#1 200 with an MSRP 200 OK message in step 245. In step 250, the UE#2 210 sends an instant message containing a particular message to the UE#1 200 over an MSRP SEND message. For example, the instant message can be expressed as follows.

```
'MSRP dkei38sd SEND
    To-Path: msrp://alicepc.example.com:7777/iau39;tcp
    From-Path: msrp://bob.example.com:8888/9di4ea;tcp
    Message-ID: 456
    Content-Type: text/plain
    Hi, UE#1!  I'm UE#2!
    -------dkei38sd$'
```

After receiving the instant message in step 250, the UE#1 200 responds to the UE#2 210 with an MSRP 200 OK message in step 255. In step 260, the UE#1 200 sends a SIP BYE message indicating the completion of the message transmission. In step 265, the UE#2 210 sends a 200 OK message, a response thereto, closing the SIP session. Thereafter, the MSRP session is also closed, ending the instant messaging service.

Assume that the UE#1 200 and the UE#2 210 transmit data during messaging service. In this case, when the data transmitted using an MSRP session is too large in size, the standard defines that the UEs should divide the data into chunks before transmission.

Therefore, the foregoing conventional IMS-based messaging service is inefficient, because it may suffer from overload if the MSRP message exchanged between the UE#1 200 and the UE#2 210 is divided into chunks. That is, data throughput for the existing chunk units has not been defined, causing a considerable delay during the actual service and resulting in a waste of the expensive wireless resources.

SUMMARY OF THE INVENTION

An aspect of the present invention is to address at least the problems and/or disadvantages and to provide at least the advantages described below. Accordingly, an aspect of the present invention is to provide a method and apparatus for efficiently sending media in a system using a session-based messaging service.

Another aspect of the present invention is to provide a method and apparatus for providing an efficient messaging service by improving an MSRP protocol signaling procedure in an IMS providing a session-based messaging service.

According to one aspect of the present invention, there is provided a media transmission method of a first server using a session-based messaging service in a communication system. The method includes setting Media Relay Capacity (MRC) information of a first User Equipment (UE); transmitting the set MRC information to a second server; receiving a response from the second server after transmitting the MRC information; and notifying the response to the first UE; wherein the response is a response that the second server has received from a second UE after notifying the second UE of the setting of the MRC information.

According to another aspect of the present invention, there is provided a media transmission apparatus using a session-based messaging service in a communication system. The apparatus includes a first server for setting Media Relay Capacity (MRC) information of a first User Equipment (UE), transmitting the set MRC information to a second server, receiving a response from the second server after transmitting the MRC information, and notifying the response to the first UE; wherein the response is a response that the second server has received from a second UE after notifying the second UE of the setting of the MRC information.

According to further another aspect of the present invention, there is provided a media transmission method of a first User Equipment (UE) using a session-based messaging service in a communication system. The method includes sending a Message Session Relay Protocol (MSRP) transmission request message corresponding to a number of message packets included in predetermined Media Relay Capacity (MRC) information, to a second UE via a first server and a second server; and when the second UE receives the MSRP transmission request message corresponding to the number of message packets, receiving one MSRP response message generated in the second UE via the second server and the first server; wherein when a chunk size indicative of a unit in which the first UE divides and sends a desired transmission message, and a transmission message size desired by the first UE, are divided in the chunk size, the MRC information includes a number of the divided message packets.

According to yet another aspect of the present invention, there is provided a media transmission apparatus using a session-based messaging service in a communication system. The apparatus includes a first User Equipment (UE) for sending a Message Session Relay Protocol (MSRP) transmission request message corresponding to a number of message packets included in predetermined Media Relay Capacity (MRC) information, to a second UE via a first server and a second server; and when the second UE receives the MSRP transmission request message corresponding to the number of message packets, receiving one MSRP response message generated in the second UE via the second server and the first server; wherein when a chunk size indicative of a unit in which the first UE divides and sends a desired transmission message, and a transmission message size desired by the first UE, are divided in the chunk size, the MRC information includes a number of the divided message packets.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE PREFERRED EMBODIMENTS

Figure 1:
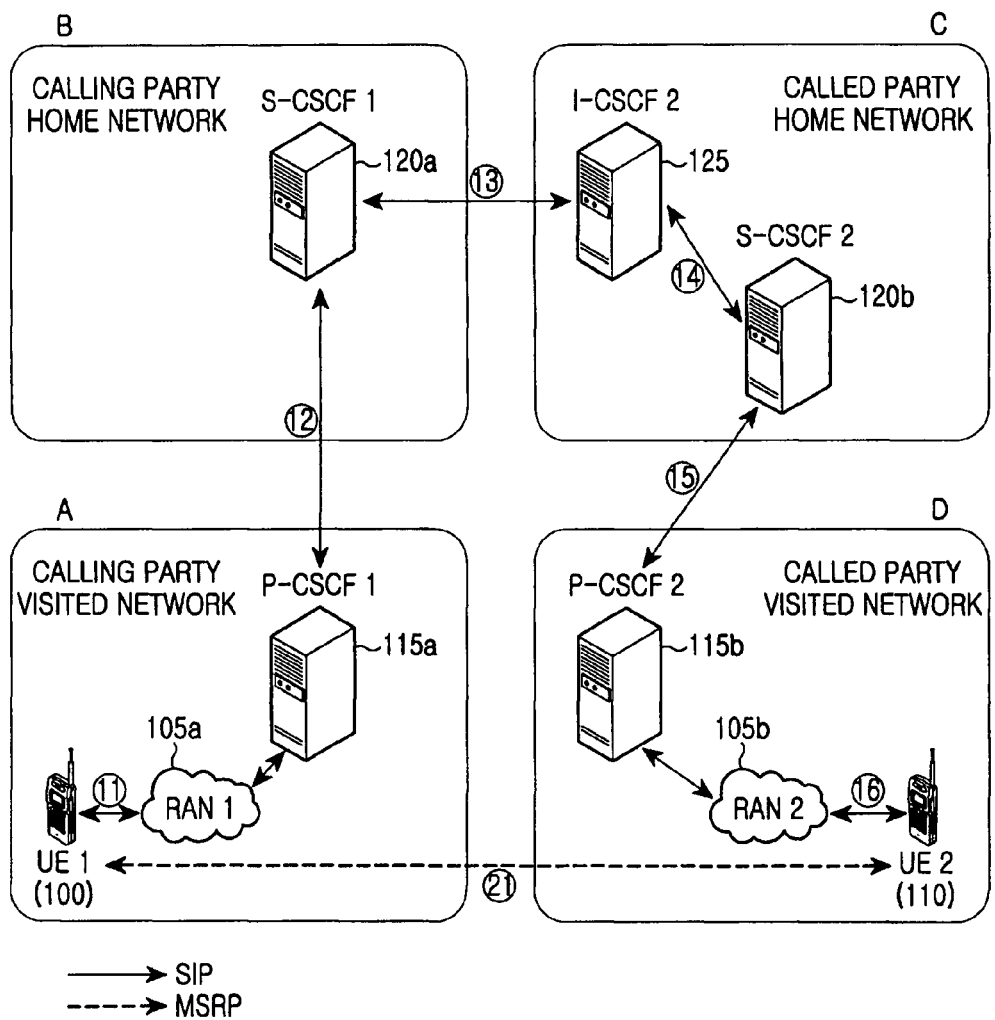
FIG. 1 is a diagram illustrating a network configuration for message delivery in the general IMS.
Figure 2:
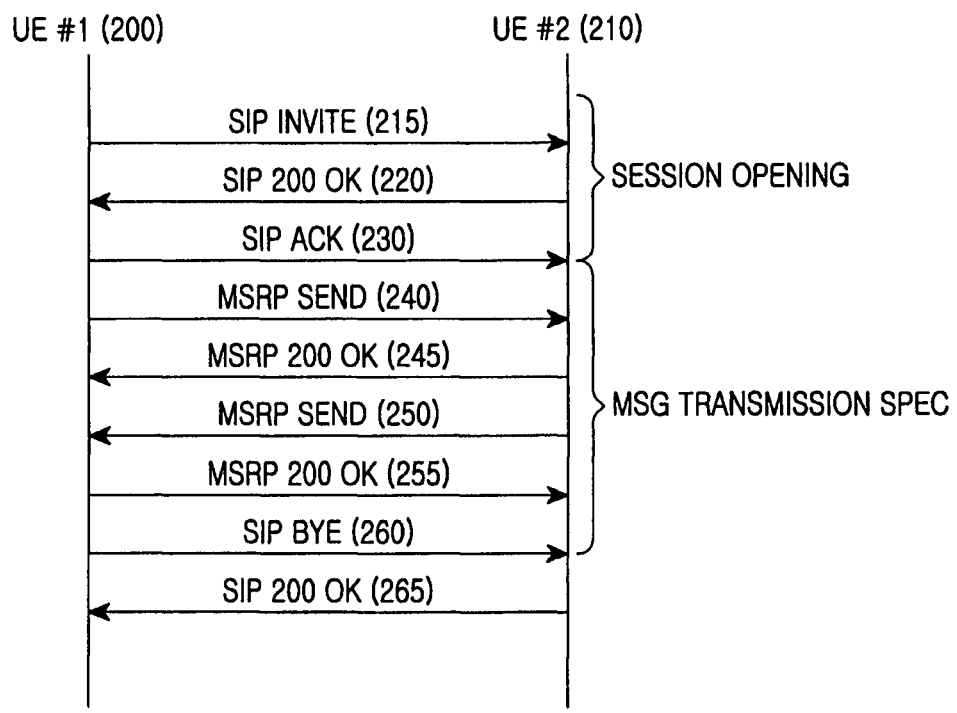
FIG. 2 is a diagram illustrating a procedure for forming an MSRP session for sending a general instant message.

FIGS. 1 through 6, discussed herein, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication network.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

Although the present invention will be described herein with reference to an IMS among the systems using SIP or MSRP, by way of example, the present invention can also be applied to the other systems using SIP or MSRP.

The present invention newly defines a Media Relay Capacity (MRC) factor obtained by defining the number of message packets and the chunk size in a Terminal Capacity. The Terminal Capacity defined in RFC 3840 will be described herein, by way of example. That is, the 'number of message packets' is the number of message packets that an IP Multimedia (IM) server transmits to minimize a load of the IMS when multiple packets are received from an originating (or calling) UE.

The present invention herein includes a procedure for registering the MRC information in the IM server, and an operating procedure between an originating UE and servers according to requirements of the originating UE, Presence (PS) server, and IM server. The following description will be made herein for the exemplary case where two UEs accessing the Wireless Broadband (Wibro) network transmit data during an IMS session-based messaging service. An IM application server exists in a mid-node, and the IM server delivers the data received from the originating UE to a terminating (or called) UE. The number of the terminating users (or UEs) can be either one or a group of several tens of users.

A detailed description will now be made of requirements of the originating UE, the PS server and the IMS server according to the present invention.

First, the requirements of the UE according to a preferred embodiment of the present invention are as follows.

(1) If a service provider provides a User Interface (UI), or chunk size set, that can be set by adjusting a chunk size of a transmission file according to the wireless environment, the UE sets a corresponding chunk size in the set chunk size set according to the wireless environment.

(2) The service provider provides a UI, by which the UE can control the number 'n' of message packets for transmitting multiple packets.

(3) When there is a change in MRC, the UE sends an SIP PUBLISH message to the PS server to notify the change in the MRC.

(4) When delivering the SIP message for forming an MSRP session, the UE can insert an MRC value into optional fields of an INVITE message and a 200 OK message, or into an SDP message.

Next, the requirements of the PS server according to a preferred embodiment of the present invention are as follows.

(1) The PS server registers the MRC information transmitted by the originating UE.

(2) When MRC changes via a UI of the UE during service, after receiving from the UE a PUBLISH message notifying the change in the MRC, the PS server sends to the IM server a NOTIFY message notifying the change.

Finally, the requirements of the IM server according to a preferred embodiment of the present invention are as follows.

(1) Upon receipt of the NOTIFY message for the MRC information from the PS server, the IM server updates MRC information of the corresponding UE with the MRC information of the NOTIFY message.

(2) An originating IM server receives MRC information of the terminating UE through a SUBSCRIBE/NOTIFY procedure with a terminating PS server. Based on the MRC information, the originating IM server compares MRC transmitted by the originating UE with MRC of the terminating UE, changes the smaller one of the two values to an MRC value in the INVITE message, and retransmits the resulting message. Specifically, assume that the number of messages in the MRC of the originating UE is greater than the number of messages in the MRC of the terminating UE. In this case, if the number of messages in the MRC of the originating UE is selected as MRC information, the terminating UE cannot receive a response message before it sends as many transmission messages as the number of messages corresponding to the MRC information of the originating UE. Therefore, the IM server sets the minimum value among the MRC values received from the terminating/originating UEs.

A description will now be made of a method for registering the MRC information in the IM server.

The method for registering the MRC information in the IM server includes a first plan in which the UE directly transmits the MRC information to the IM server, and a second plan in which the service provider previously sets the MRC information in the IM server.

Figure 3:
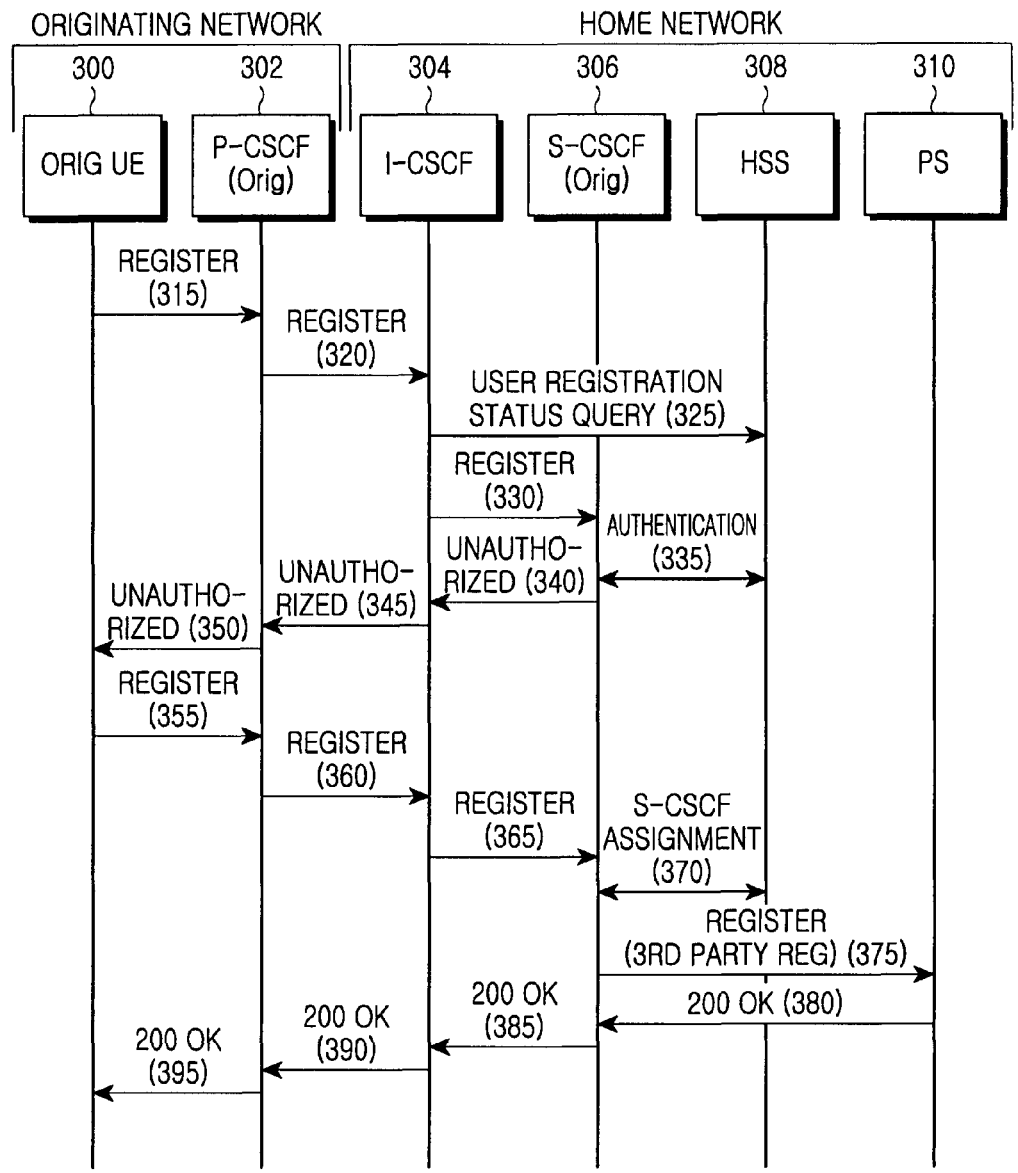
FIG. 3 is a diagram illustrating a procedure for registering MRC information in an IM server by a UE according to a first plan of the present invention.
Figure 4:
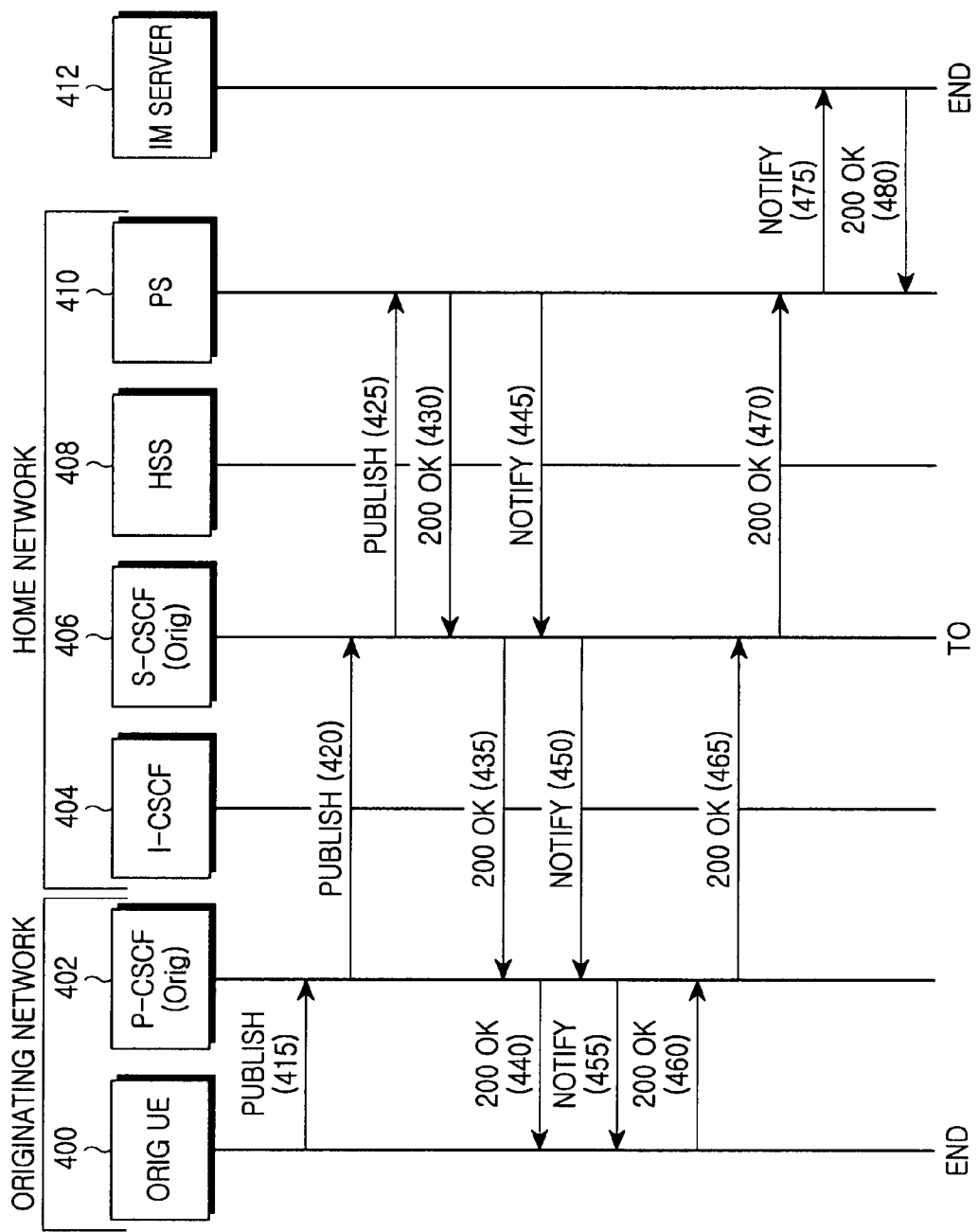
FIG. 4 is a diagram illustrating a procedure for registering MRC information in an IM server upon a change in MRC information of a UE according to the first plan of the present invention.

In the first plan, during the IMS registration procedure performed as shown in FIG. 3, an originating UE delivers MRC information to a PS server over a REGISTER message, and the PS server stores the received MRC information. If the originating UE, when it changes the MRC information, sends to the PS server a PUBLISH message notifying the change in the MRC information as shown in FIG. 4, the PS server notifies the change in the MRC information to an IM server, registered as a watcher.

FIG. 3 is a diagram illustrating a procedure for registering MRC information in an IM server by a UE according to a first plan of the present invention.

Herein, an originating UE 300 and a P-CSCF 302 are included in the network where the originating UE is currently located, and an I-CSCF 304, an S-CSCF 306, an HSS 308 and a PS server 310 are included in a home network.

Referring to FIG. 3, in step 315, the originating UE 300 includes the MRC information in a REGISTER message for IMS registration, and sends it to the P-CSCF 302. In step 320, the P-CSCF 302 forwards the REGISTER message to the I-CSCF 304. The MRC information herein includes a chunk size and the number of message packets. The number of message packets is a value determined by dividing the entire transmission message size by the chunk size.

In step 325, the I-CSCF 304 sends a query to the HSS 308 over a Cx interface to search for the S-CSCF 306 of the home network. In step 330, the I-CSCF 304 sends the REGISTER message to the S-CSCF 306, and in step 335, the S-CSCF 306 and the HSS 308 exchange authentication vectors for registration of the originating UE 300 according to the REGISTER message.

In steps 340 to 350, the authentication information is delivered from the HSS 308 to the originating UE 300 via the S-CSCF 306, the I-CSCF 304 and the P-CSCF 302 over unauthorized messages.

Thereafter, in steps 355 to 365, for IMS registration, the originating UE 300 re-sends a REGISTER message including user authentication information and MRC information to the S-CSCF 306 via the P-CSCF 302 and the I-CSCF 304. If the IMS registration is accepted between the S-CSCF 306 and the HSS 308 in step 370, the S-CSCF 306 performs in step 375 a 3rd Party Registration procedure and stores MRC of the REGISTER message in the PS server 310.

If the MRC is stored, the PS server 310 sends a 200 OK message, a response to the IMS and MRC registration, to the originating UE 300 via the S-CSCF 306, the I-CSCF 304 and the P-CSCF 302 in steps 380 to 395.

FIG. 4 is a diagram illustrating a procedure for registering MRC information in an IM server upon a change in MRC information of a UE according to the first plan of the present invention.

Herein, an originating UE 400 and a P-CSCF 402 are included in the network where the originating UE is currently located, and an I-CSCF 404, an S-CSCF 406, an HSS 408, a PS server 410 and an IM server 412 are included in a home network.

Referring to FIG. 4, in step 415, the originating UE 400, when its subscriber has changed MRC information, transfers the changed MRC information to the P-CSCF 402 over a PUBLISH message. In steps 420 and 425, the P-CSCF 402 sends the PUBLISH message to the PS server 410 via the S-CSCF 406. Then the PS server 410 registers the changed MRC information, recognizing the change in the MRC information through the PUBLISH message. Thereafter, in steps 430 to 440, the PS server 410 sends a 200 OK message, a response message to the PUBLISH message, to the originating UE 400 via the S-CSCF 406 and the P-CSCF 402. In steps 445 to 455, the PS server 410 sends a NOTIFY message notifying the change in the MRC information, to the originating UE 400 via the S-CSCF 406 and the P-CSCF 402.

In steps 460 to 470, the originating UE 400 sends a 200 OK message, or a response message to the NOTIFY message, to the PS server 410 via the P-CSCF 402 and the S-CSCF 406.

Thereafter, in the process of registering MRC change information, the PS server 410 sends in step 475 a NOTIFY message to transmit the changed MRC to the IM server 412, and the IM server 412 sends in step 480 a 200 OK message, a response to the NOTIFY message, to the PS server 410.

The originating UE 400, when it sends an SIP message to form an MSRP session, inserts the MRC information in the SIP message or in SDP, and sends the resulting message to the PS server 410. For example, by setting an optional field of the SIP message or MRC information of the UE in an SDP message, the MRC information can be transferred to the IM server and the terminating UE.

In the second plan, the service provider, when it previously sets an IM server, previously sets MRC information of each individual subscriber in the provisioning information necessary in advance for the IM server setting. Therefore, because the MRC information is previously set in the IM server, the corresponding UE does not need a separate MRC registration procedure.

Figure 5:
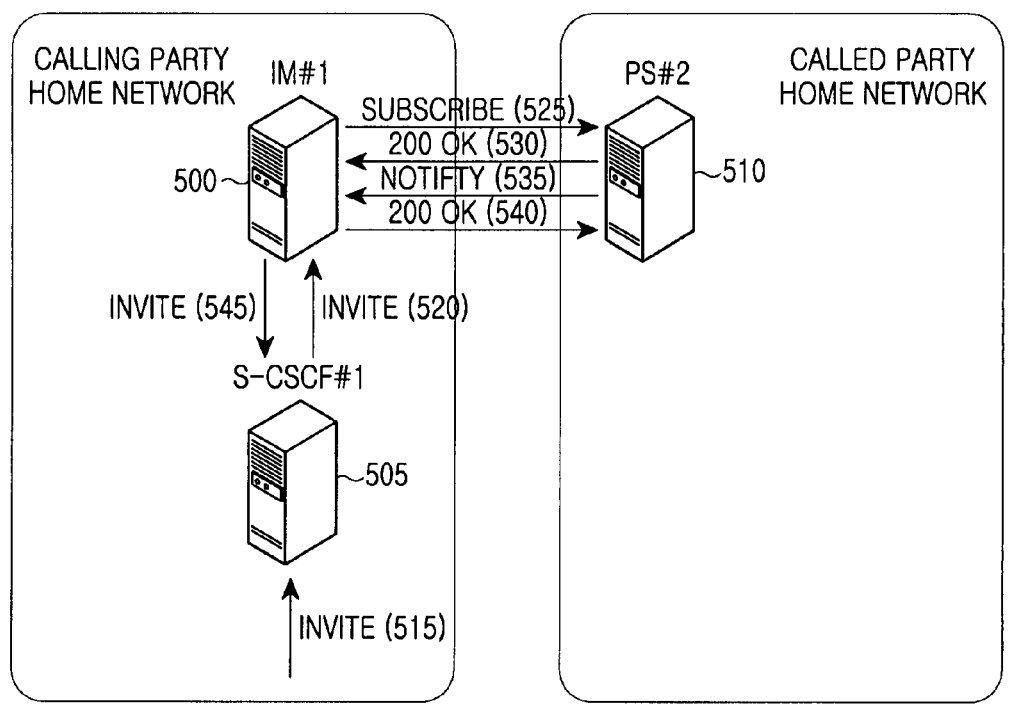
FIG. 5 is a diagram illustrating an APPROVE/NOTIFY procedure of an IM server for the signaling for receiving MRC information according to a preferred embodiment of the present invention.

FIG. 5 is a diagram illustrating an APPROVE/NOTIFY procedure of an IM server for the signaling for receiving MRC information according to a preferred embodiment of the present invention.

Herein, an IM#1 500 and an S-CSCF#1 505 are included in an originating home network, and a PS#2 510 is included in a terminating home network.

Referring to FIG. 5, when an originating UE attempts a call to a terminating UE in step 515, the S-CSCF#1 505 receiving an INVITE message, including MRC information of the originating UE, sends the INVITE message to the IM#1 500 in step 520. Then the IM#1 500 stores originating MRC information received over the INVITE message.

In step 525, the IM#1 500 sends to the PS#2 510 a SUBSCRIBE message for subscribing to terminating MRC information and receives from the PS#2 510 a 200 OK message, a response thereto, in step 530. In step 535, the PS#2 510 sends to the IM#1 500 a NOTIFY message including the terminating MRC information. In step 540, the IM#1 500 sends to the PS#2 510 a 200 OK message, a response to the NOTIFY message.

Thereafter, the IM#1 500 compares the received terminating MRC information with the stored originating MRC information, and sets a lesser one of the two values as the current MRC information, and then sends in step 545 an INVITE message, including the set MRC information, to the terminating UE via the S-CSCF#1 505.

Figure 6:
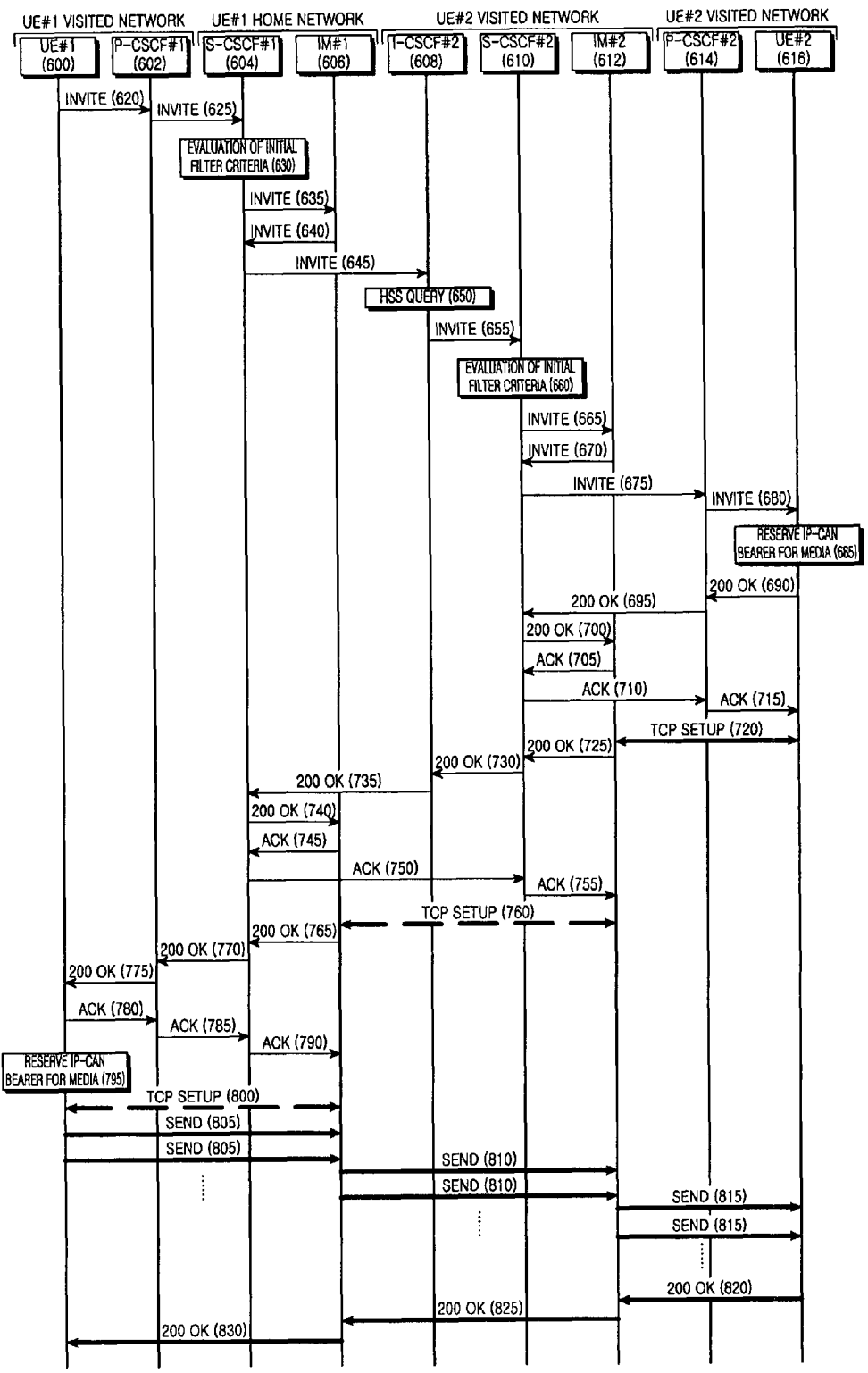
FIG. 6 is a diagram illustrating an operating procedure between a UE and a server according to a preferred embodiment of the present invention.

FIG. 6 is a diagram illustrating an operating procedure between a UE and a server according to a preferred embodiment of the present invention. Herein, a UE#1 600 and a P-CSCF#1 602 are included in an originating visited network; an S-CSCF#1 604 and an IM#1 606 are included in an originating home network; an I-CSCF#2 608, an S-CSCF#2 610 and an IM#2 612 are included in a terminating home network; and a P-CSCF#2 614 and a UE#2 616 are included in a terminating visited network. In addition, it is assumed that Provisional Acknowledgement (PRACK)-based precondition is not taken into consideration. If the UE#1 600, after sending an MSRP SEND request message, waits for an MSRP 200 OK message in response thereto every time, it may suffer from a delay. In this case, because an increase in the number of transmission messages causes a waste of the wireless resources, a multi-packet transmission method is applied. Referring to FIG. 6, to form an MSRP session to the UE#2 616, in steps 620 to 625, the UE#1 600 generates a session URL to be used as an identifier of the MSRP session, loads an address and a port number in the URL on an SDP, and then sends an SIP INVITE message, including its own MRC information, to the S-CSCF#1 604 via the P-CSCF#1 602.

In step 630, the S-CSCF#1 604 checks a service profile of the UE#1 600 before sending the SIP INVITE message to another network, and takes an appropriate action according to an initial filtering criteria contained in the service profile. According to the action taken, the SIP INVITE message is sent to another CSCF, or an application server.

In step 635, the S-CSCF#1 604 sends the SIP INVITE message to the IM#1 606. Here, it is assumed that the IM#1 606 has acquired MRC information of the UE#2 616 through steps 525 to 540 of FIG. 5.

Thereafter, the IM#1 606 compares the received MRC information of the UE#1 600 with the MRC information of the UE#2 616, and sets a lesser one of the two values as the current MRC information. Thereafter, upon receipt of an INVITE message including the current MRC information from the IM#1 606 in step 640, the S-CSCF#1 604 sends an INVITE message to the I-CSCF#2 608 in step 645.

In step 650, the I-CSCF#2 608 sends a query to an HSS of a home network of the UE#2 616 via a Cx interface to search for the S-CSCF#2 610 of the UE#2 616. In step 655, the I-CSCF#2 608 sends the SIP INVITE message to the S-CSCF#2 610.

In step 660, the S-CSCF#2 610 can send the SIP INVITE message to another CSCF or to an application server according to an initial filtering criteria. In step 665, the S-CSCF#2 610 sends an SIP INVITE request message, including the current MRC information, to the IM#2 612, and in step 670, the IM#2 612 sends the SIP INVITE message to the S-CSCF#2 610.

In steps 675 to 680, the SIP INVITE message is delivered to the UE#2 616 via the P-CSCF#2 614. In step 685, the UE#2 616 allocates an IP-Capable Access Network (IP-CAN) bearer for SIP message session media component. After reserving the IP-CAN bearer, the UE#2 616 sends in step 690 a 200 OK response message to the P-CSCF#2 614. The 200 OK message, a response to an SDP proposal of the SIP INVITE message, includes an SDP accept therein, and the SDP includes therein MSRP session information (address and TCP port) to be delivered to the IM#2 612. Here, each IP-CAN bearer is used for transmission of the SIP message or the MSRP message. Assuming that the IP-CAN bearer for transmitting the SIP message has already been allocated, the present invention considers only the allocation of the IP-CAN bearer used for sending an MSRP message of the MSRP session.

Upon receipt of a 200 OK message from the P-CSCF#2 614 in step 695, the S-CSCF#2 610 sends the 200 OK message to the IM#2 612 in step 700. In step 705, the IM#2 612 generates an ACK request in response to the SIP 200 OK message, and sends it to the S-CSCF#2 610, and in step 710, the S-CSCF#2 610 forwards the ACK request to the P-CSCF#2 614. In step 715, the P-CSCF#2 614 delivers the ACK request to the UE#2 616.

In step 720, the IM#2 612 and the UE#2 616 sets up a TCP connection with a port and an address in an MSRP URL in the SDP received from the UE#2 616 using the IP-CAN bearer generated in step 690, and then sends an 200 OK message to the S-CSCF#2 610 in step 725.

In steps 730, 735 and 740, the 200 OK message is delivered to the IM#1 606 via the I-CSCF#2 608 and the S-CSCF#1 604 in the reverse order of the path via which the SIP INVITE request message was delivered.

In step 745, the IM#1 606 generates an ACK request, and sends it to the S-CSCF#1 604. In step 750, the S-CSCF#1 604 forwards the ACK request to the S-CSCF#2 610, and in step 755, the S-CSCF#2 610 forwards the ACK request to the IM#2 612.

In step 760, the IM#1 606 sets up a TCP connection with the port and address in an MSRP URL in the SDP received from the IM#2 612. In steps 765 to 775, the IM#1 606 sends a 200 OK message to the UE#1 600 via the S-CSCF#1 604 and the P-CSCF#1 602 in response to the SIP INVITE message.

In steps 780 to 790, the UE#1 600 sends an ACK request to the IM#1 606 via the P-CSCF#1 602 and the S-CSCF#1 604, completing establishment of an SIP session between the UE#1 600 and the UE#2 616.

In step 795, the UE#1 600 allocates an IP-CAN bearer, and an MSRP message is transferred between the UE#1 600 and the IM#1 606 over the IP-CAN bearer.

In step 800, the UE#1 600 sets up a TCP connection with the port and address in an MSRP URL in the SDP received from the IM#1 606. Thereafter, in steps 805 to 815, the UE#1 600, when it transmits a desired transmission message to the UE#2 616, includes in an MSRP SEND request message as many the foregoing messages as the number 'n' of multi-packet messages set in the current MRC information, and sends it to the UE#2 616 via the IM#1 606 and the IM#2 612. Here, the MSRP SEND request message is transferred over the TCP connection used by the MSRP session.

In steps 820 to 830, the UE#2 616 sends an MSRP 200 OK message, a response to the MSRP SEND message, to the UE#1 600 via the IM#2 612 and the IM#1 606 over the TCP connection. When the UE#2 616 sends a message to the UE#1 600, the process of steps 805 to 810 is performed in the opposite way.

As described in FIG. 6, the originating UE sends n MSRP SEND messages at a time (see 805), and then waits for one MSRP 200 OK message, a response thereto. Thereafter, upon receipt of the one MSRP 200 OK message, the originating UE re-sends n MSRP SEND messages at a time. If an $n^{th}$ message is missing, a terminating UE sends a Failure REPORT request message indicating the reception failure of the MSRO SEND message, instead of an MSRP 200 OK response message, thereby notifying the failure to the originating UE. The number of the message packets delivered at a time can be adjusted taking into account a request of the service provider and/or a characteristic of the wireless environment.

As is apparent from the foregoing description, the present invention can improve overhead of the MSRP protocol during the session-based messaging service, thereby facilitating fast data transmission without delay and minimizing a waste of resources of the air network.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A media transmission method using a session-based messaging service in an Internet Protocol (IP) Multimedia Subsystem (IMS), the method comprising:

setting, by a first server being an originating IP Multimedia (IM) server in a calling party home network, Media Relay Capacity (MRC) information of a first User Equipment (UE) prior to a data communication session with the first UE, the MRC information including a number of multiple packets and a chunk size of each packet;

notifying, by the first server, the MRC information to a second server being a terminating IM server in a called party home network;

receiving, by the first server, multiple packets carrying a transmission message for the session-based messaging service according to the number of multiple packets and the chunk size from the first UE, and sending, by the first server, the multiple packets to a second UE via the second server; and receiving, by the first server, one response indicative a receipt or a missing of the multiple packets from the second UE via the second server;

wherein setting the MRC information comprises:
receiving, by the first server, first MRC information from the first UE through an INVITE message for establishing a Message Session Relay Protocol (MSRP) session;
sending a request for second MRC information of the second UE to the second server;
receiving the second MRC information from the second server;
comparing the second MRC information of the second UE with the first MRC information; and
setting a lesser one of the first and second MRC information as the MRC information of the first UE.

2. The media transmission method of claim 1, wherein the setting further comprises:
in response to a change in the first MRC information, receiving from the first UE an MRC information change message including the changed first MRC information;
changing the changed first MRC information to first MRC information of the first UE; and
notifying the first UE of the change in the first MRC information to the changed first MRC information.

3. The media transmission method of claim 1, wherein the MRC information is included in optional fields of the INVITE message of a session initiation protocol that the first UE has generated to form the MSRP session, and of an INVITE, response message generated by the second UE that has received the INVITE message, or included in a Session Description Protocol (SDP) message.

4. The media transmission method of claim 3, wherein the multiple packets include divided messages of MSRP transmission request messages received from the first UE to the second UE via the second server, and
when the second UE receives the multiple packets corresponding to the number of multiple packets included in the MRC information, the one response includes one MSRP response message generated in the second UE and the MSRP response message is sent to the first UE.

5. A media transmission apparatus configured to use a session-based messaging service in an Internet Protocol (IP) Multimedia Subsystem (IMS), the apparatus comprising:
a first server configured to set Media Relay Capacity (MRC) information of a first User Equipment (UE), the MRC information including a number of multiple packets and a chunk size of each packet, prior to a data communication session with the first UE, notify the MRC information to a second server, receive multiple packets carrying a transmission message for the session-based messaging service according to the number of multiple packets and the chunk size from the first UE, send the multiple packets to a second UE via the second server, and receive one response indicative a receipt or a missing of the multiple packets from the second UE via the second server,
wherein the first server is an original IP Multimedia (IM) server in a calling party home network, the second serving is a terminating IM server in a called party home network, and the MRC information includes the number of multiple packets and the chunk size of each packet, and
wherein the first server is configured to receive first MRC information from the first UE through an INVITE message for establishing a Message Session Relay Protocol (MSRP) session, send a request for second MRC information of the second UE to the second server, receive the second MRC information from the second server, compare the second MRC information of the second UE with the first MRC information, and set a lesser one of the first and second MRC information as the MRC information of the first UE.

6. The media transmission apparatus of claim 5, wherein the first server is further configured to:
in response to a change in the first MRC information, receive from the first UR an MRC information change message including the changed first MRC information;
change the changed first MRC information to first MRC information of the first UE; and
notify the first UE of the change in the first MRC information to the changed first MRC information.

7. The media transmission apparatus of claim 5, wherein the MRC information is included in optional fields of the INVITE message of a session initiation protocol that the first UE has generated to form the MSRP session, and of an INVITE response message generated by the second UE that has received the INVITE message, or included in a Session Description Protocol (SDP) message.

8. The media transmission apparatus of claim 7, wherein the multiple packets include divided messages of MSRP transmission request messages received from the first UE to the second UE via the second server,
when the second UE is configured to receive the MSRP transmission request message corresponding to the number of multiple packets included in the MRC information, the one response includes one MSRP response message generated in the second UE, and
the MSRP response message is sent to the first UE.

9. A media transmission method of a first User Equipment (UE) using a session-based messaging service in an Internet Protocol (IP) Multimedia Subsystem (IMS), the method comprising:
setting, by the first UE, first Media Relay Capacity (MRC) information of the first UE prior to establish a Message Session Relay Protocol (MSRP) session;
transmitting, by the first UE to a first server, the first MRC information through an INVITE message for establishing the MSRP session;
sending, by the first UE, multiple packets carrying a transmission message for the session-based messaging service corresponding to a number of multiple packets and a, chunk size of each packet included in MRC information set in the first server, to a second UE via the first server and a second server; and
when the second UE receives the multiple packets corresponding to the number of message packets, receiving, by the first UE, one response including a MSRP response message generated in the second UE via the second server and the first server;
wherein the first server is an original IP Multimedia (IM) server in a calling party home network, and the second serving is a terminating IM server in a called party home network, and
wherein the MRC information of the first UE includes a lesser one of the first MRC information that the first UE has transmitted to the first server and second MRC information that the second UE has transmitted to the first server via the second server.

10. The media transmission method of claim 9, further comprising:
in response to a change in the first MRC information, sending an MRC information change message including the changed MRC information to the first server; and receiving from the first server a notification indicating a change in the first MRC information to the changed first MRC information.

11. The media transmission method of claim 9, wherein the MRC information is included in optional fields of the INVITE message and a response message both generated when the first UE sends a session initiation protocol message to form the MSRP session, or included in a Session Description Protocol (SDP) message.

12. A media transmission apparatus configured to use a session-based messaging service in an Internet Protocol (IP) Multimedia Subsystem (IMS), the apparatus comprising:
a first User Equipment (UE) configured to set first Media Relay Capacity (MRC) information of the first UE prior to establishing a Message Session Relay Protocol (MSRP) session, transmit, by the first UE to a first server, the first MRC information through an INVITE message for establishing the MSRP session, send multiple packets carrying a transmission message for the session-based messaging service corresponding to a number of multiple packets and a chunk size of each packet included in MRC information set in the first server, to a second UE via the first server and a second server, and when the second UE receives the MSRP transmission request message corresponding to the number of message packets, receive one response including a MSRP response message generated in the second UE via the second server and the first server,
wherein the first server is an original IP Multimedia (IM) server in a calling party home network, and the second serving is a terminating IM server in a called party home network, and
wherein the MRC information of the first UE includes a lesser one of the first MRC information that the first UE has transmitted to the first server and second MRC information that the second UE has transmitted to the first server via the second server.

13. The media transmission apparatus of claim 12, wherein the first UE is further configured to:
in response to a change in the first MRC information, send an MRC information change message including the changed MRC information to the first server; and
receive from the first server a notification indicating a change in the first MRC information to the changed first MRC information.

14. The media transmission apparatus of claim 12, wherein the MRC information is included in optional fields of the INVITE message and a response message both generated when the first UE sends a session initiation protocol message to form the MSRP session, or included in a Session Description Protocol (SDP) message.

15. The media transmission apparatus of claim 12, wherein the MRC information defines a number of packets included in a message transmission and a size of the packets included in the message transmission for the MSRP session.

16. The media transmission method of claim 1, wherein the MRC information defines a number of packets included in a message transmission and a size of the packets included in the message transmission for the data communication session.

17. The media transmission apparatus of claim 5, wherein the MRC information defines a number of packets included in a message transmission and a size of the packets included in the message transmission for the data communication session.

18. The media transmission method of claim 9, wherein the MRC information defines a number of packets included in a message transmission and a size of the packets included in the message transmission for the MSRP session.

* * * * *